(12) United States Patent
Inturi et al.

(10) Patent No.: US 8,862,544 B2
(45) Date of Patent: *Oct. 14, 2014

(54) GRID BASED REPLICATION

(75) Inventors: Nagaraju Inturi, Overland Park, KS (US); Clarence M. Pruet, III, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/615,156

(22) Filed: Sep. 13, 2012

(65) Prior Publication Data

US 2013/0006934 A1    Jan. 3, 2013

Related U.S. Application Data

(63) Continuation of application No. 13/149,374, filed on May 31, 2011, now Pat. No. 8,566,280.

(51) Int. Cl.
*G06F 17/30* (2006.01)
(52) U.S. Cl.
CPC .............................. *G06F 17/30212* (2013.01)
USPC .......................................... 707/634; 707/638
(58) Field of Classification Search
None
See application file for complete search history.

(56) References Cited

U.S. PATENT DOCUMENTS

| 7,031,974 | B1 | 4/2006 | Subramaniam | |
| 7,814,067 | B2 | 10/2010 | Souder et al. | |
| 7,899,785 | B2 | 3/2011 | Yuan et al. | |
| 8,341,462 | B2* | 12/2012 | Broda et al. | ..................... 714/25 |
| 8,566,280 | B2* | 10/2013 | Inturi et al. | ................... 707/634 |
| 2006/0190497 | A1 | 8/2006 | Inturi et al. | |
| 2009/0064151 | A1 | 3/2009 | Agarwal et al. | |
| 2009/0106323 | A1 | 4/2009 | Wong et al. | |
| 2009/0150396 | A1* | 6/2009 | Elisha et al. | ...................... 707/8 |
| 2009/0300075 | A1 | 12/2009 | Guan et al. | |
| 2010/0114817 | A1 | 5/2010 | Broeder et al. | |
| 2010/0169289 | A1 | 7/2010 | Newport et al. | |
| 2010/0191884 | A1 | 7/2010 | Holenstein et al. | |
| 2011/0041006 | A1* | 2/2011 | Fowler | ........................... 714/10 |
| 2011/0072217 | A1* | 3/2011 | Hoang et al. | ................. 711/130 |

OTHER PUBLICATIONS

David, S. and S. Moe, "IBM Informix Database Software", New Features in Informix 11.70, The Technical White Paper, Oct. 12, 2010, Total 62 pp.

Li, J., G. Luo, and H. Chen, "Research on Replication Strategies for Data Grid Based on OptorSim", Fourth International Conference on Networked Computing and Advanced Information Management, © 2008 IEEE, Total 4 pp (Also NCM Fourth International Conference on, Sep. 2-4, 2008, pp. 613-616).

(Continued)

*Primary Examiner* — Wilson Lee
(74) *Attorney, Agent, or Firm* — Janaki K. Davda; Konrad, Raynes, Davda & Victor LLP

(57) ABSTRACT

Provided are techniques for replication in a grid based environment. Grid control structures, including a grid command structure, are created. At an authorized node in a grid of nodes, a Data Definition Language (DDL) operation is received, the DDL operation is inserted into the grid command structure, and the DDL operation is propagated from the authorized node to one or more other nodes in the grid of nodes at the end of a transaction that inserted the DDL operation into the grid command structure.

9 Claims, 18 Drawing Sheets

(56) References Cited

OTHER PUBLICATIONS

McElroy, P., "Grid Control 10.2.0.5: Streams Management", Oracle Corporation, [online], [Retrieved on Apr. 26, 2011]. Retrieved from the Internet at <URL:http://www.oracle.com/technetwork/database/features/data-integration/index.html>, Total 50 pp.

Oracle, "Oracle Database 11g Features: Data Replication & Integration", [online], [Retrieved on Apr. 26, 2011]. Retrieved from the Internet at <URL:http://www.oracle.com/technetwork/database/features/data-integration/index.html>, Total 2 pp.

Oracle, "Oracle Streams Feature Overview", Oracle Data Sheet, © 2007, Total 4 pp.

Oracle, "Oracle Streams", An Oracle White Paper, Oct. 2002, Total 18 pp.

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

Ray, A., "Implementing Replication with Oracle Streams", Oracle Corporation, Database High Availability, Nov. 11-15, 2007, Total 43 pp.

Sathya, S.S., S. Kuppuswami, and R. Ragupathi, "Replication Strategies for Data Grids", © 2006 IEEE, Total 6 pp (Also ADCOM International Conference on, Dec. 20-23, 2006, pp. 123-128).

U.S. Appl. No. 13/149,374, filed May 31, 2011, entitled "Grid Based Replication", invented by Inturi, N. and C.M. Pruet III, Total pp. 52 [57.237 (Appln)].

Preliminary Amendment, Sep. 13, 2012, for U.S. Appl. No. 13/149,374, filed May 31, 2011 by N. Inturi et al., Total pp. 7 [57.237 (PrelimAmend)].

Amendment 1, Feb. 5, 2013, for U.S. Appl. No. 13/149,374, filed May 31, 2011 by N. Inturi et al., Total 10 pp. [Amend1 (57.237)].

Amendment 2, Jun. 4, 2013, for U.S. Appl. No. 13/149,374, filed May 31, 2011 by N. Inturi et al., Total 8 pp. [Amend2 (57.237)].

Final Office Action, Apr. 11, 2013, for U.S. Appl. No. 13/149,374, filed May 31, 2011 by N. Inturi et al., Total 7 pp. [FOA (57.237)].

Notice of Allowance, Jun. 17, 2013, for U.S. Appl. No. 13/149,374, filed May 31, 2011 by N. Inturi et al., Total 9 pp. [NOA (57.237)].

Office Action 1, Nov. 7, 2012, for U.S. Appl. No. 13/149,374, filed May 31, 2011 by N. Inturi et al., Total 17 pp. [OA1 (57.237)].

* cited by examiner

```
BEGIN WORK;
CREATE TABLE AUDTAB(
      ACT   CHAR,
      COL1  INTEGER,
      COL2  INTEGER)

CREATE TABLE TAB1 (
      COL1  INTEGER PRIMARY KEY,
      COL2  INTEGER);

CREATE TABLE TAB2 (
      COL1  INTEGER PRIMARY KEY,
      COL2  INTEGER REFERENCES TAB1 (COL1));

CREATE TRIGGER DELTAB1 INSERT on TAB1
      REFERENCING new AS ins
      FOR EACH ROW
            (
            INSERT into audtab values ('I', ins.col1, ins.col2);
            );
INSERT into TAB1 values (1,1);
INSERT INTO TAB2 values (1,1);
COMMIT WORK;
```

FIG. 4

US 8,862,544 B2

GRID BASED REPLICATION

CROSS-REFERENCE TO RELATED APPLICATION

This application is a continuation of U.S. patent application Ser. No. 13/149,374, filed May 31, 2011, which application is incorporated herein by reference in its entirety.

BACKGROUND

Embodiments of the invention relate to grid based replication.

Traditional database replication is normally either a complete replication solution (such as High Availability Data Replication (HDR)/High Availability Disaster Recovery (HADR) replication) or a change data capture/apply technique. Complete replication solutions tend to require similarity with source/target systems. That is, such solutions typically need to run the same software and run on similar hardware platforms. On the other hand, computer grid based environments typically run on dissimilar software and hardware. Because of this, change data capture/apply replication solutions are generally more appropriate for the grid based environment.

A grid based environment (also referred to as a "computer grid" or "grid") may be described as one in which there are multiple, heterogeneous nodes (e.g., servers) that are used to reach one or more common goals. The grid based environment may be thought of as a distributed system of nodes. The nodes in the grid based environment may also be geographically dispersed. A grid based environment may be used to replicate data at multiple nodes.

SUMMARY

Provided are a method, computer program product, and system for replication in a grid based environment. Grid control structures, including a grid command structure, are created. At an authorized node in a grid of nodes, a Data Definition Language (DDL) operation is received, the DDL operation is inserted into the grid command structure, and the DDL operation is propagated from the authorized node to one or more other nodes in the grid of nodes at the end of a transaction that inserted the DDL operation into the grid command structure.

BRIEF DESCRIPTION OF THE SEVERAL VIEWS OF THE DRAWINGS

Referring now to the drawings in which like reference numbers represent corresponding parts throughout:

FIG. 4 illustrates example SQL statements in accordance with certain embodiments.

FIG. 10 is formed by FIGS. 10A, 10B, 10C and 10D.

FIG. 12 is formed by FIG. A and FIG. B.

DETAILED DESCRIPTION

Figure 1:
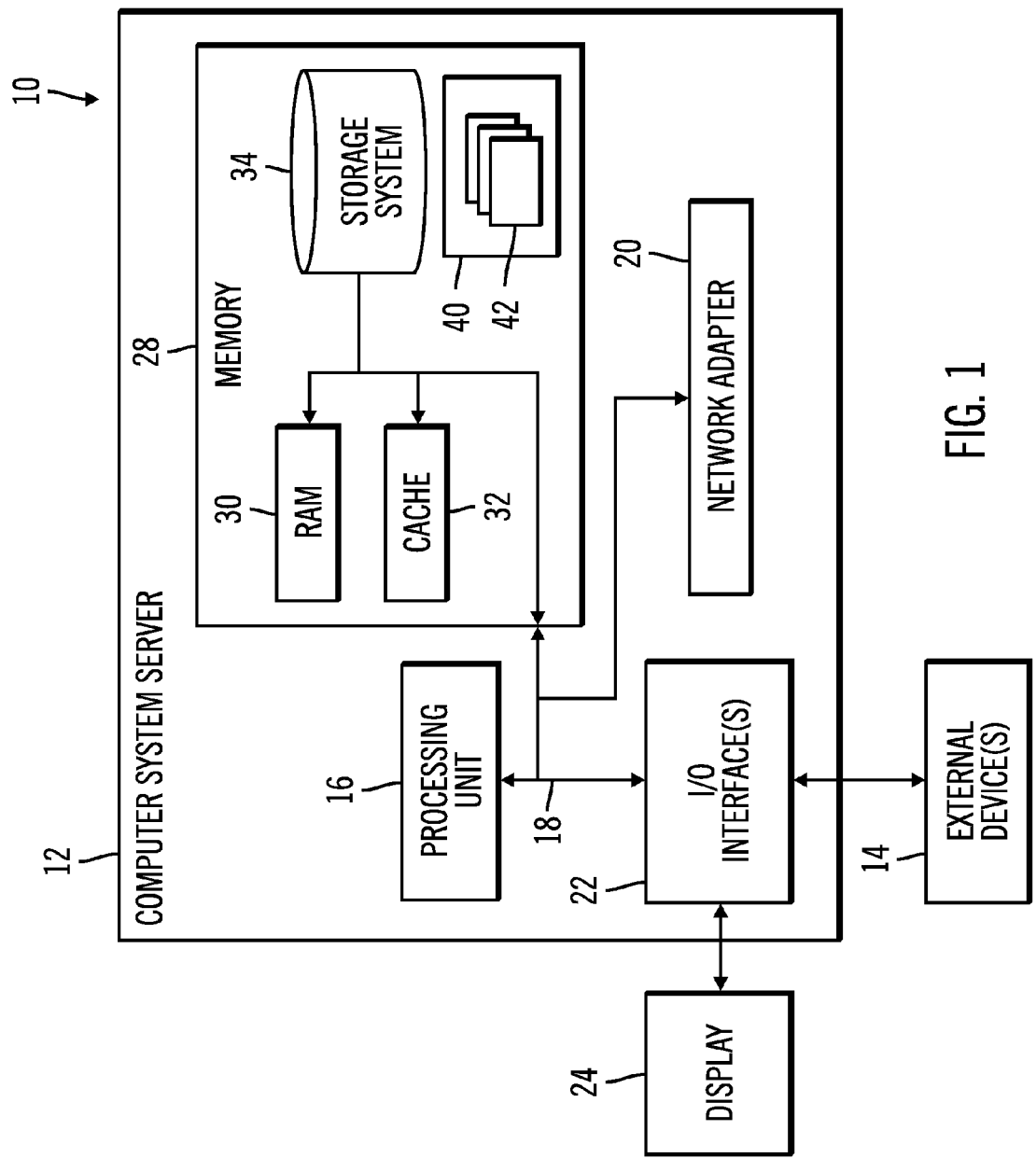
FIG. 1 depicts a cloud computing node in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
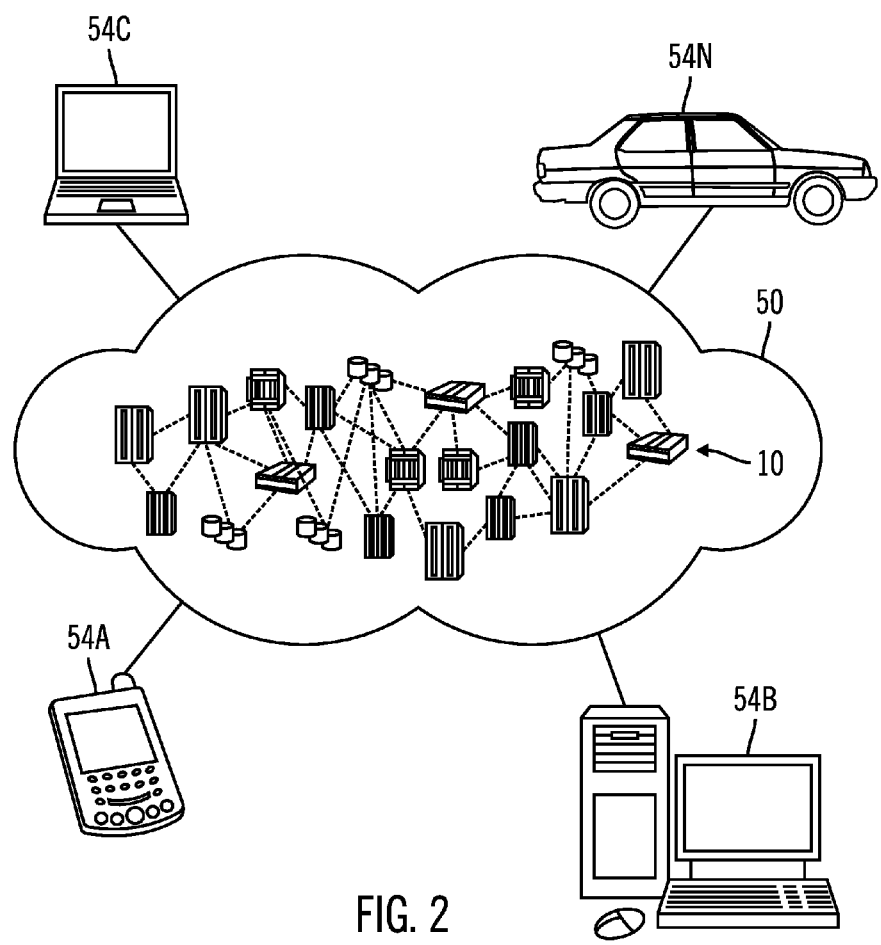
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
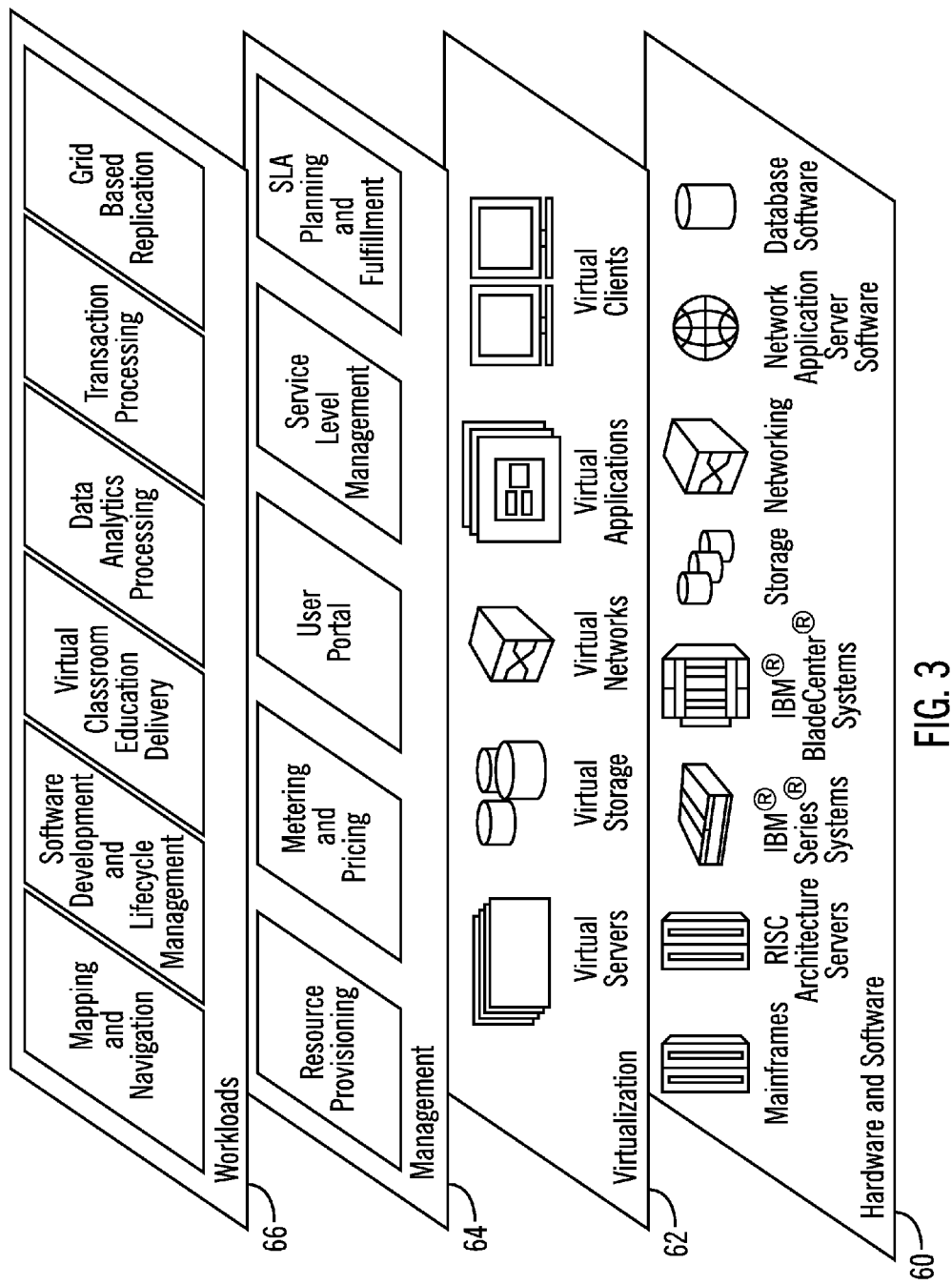
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and grid based replication.

Thus, in certain embodiments, software, implementing grid based replication in accordance with embodiments described herein, is provided as a service in a cloud environment.

FIG. 4 illustrates example SQL statements in accordance with certain embodiments. Embodiments allow such example SQL statements to be propagated to one or more target nodes from a source node.

Embodiments maintain consistency of not only the data, but of the replication rules governing the data, and coordinate the Data Definition Language (DDL) operations of the transaction with the registration of the replication metadata and with the capture of the Data Manipulation Language (DML) operations performed within a transaction.

Figure 5:
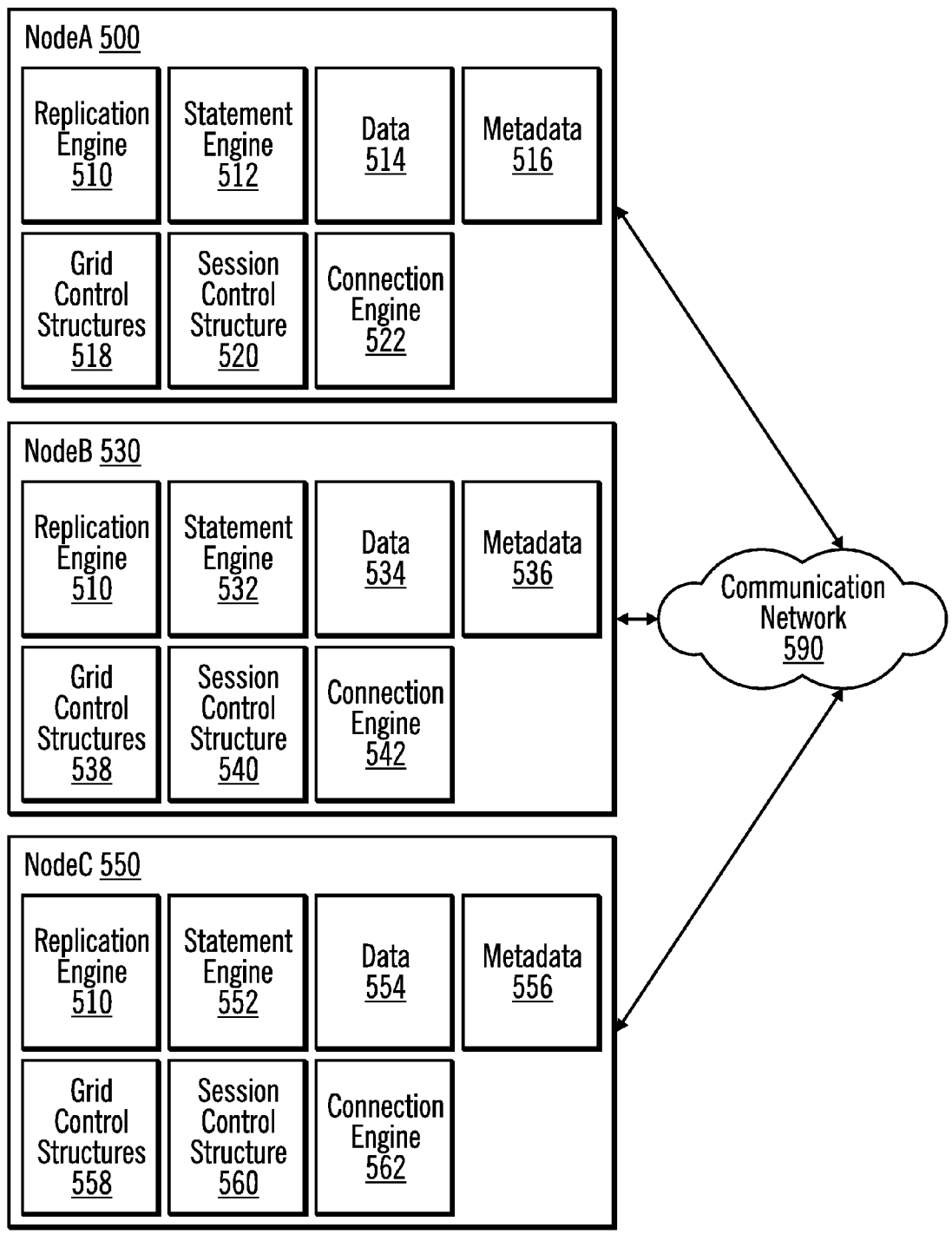
FIG. 5 illustrates nodes a grid based environment in accordance with certain embodiments.

FIG. 5 illustrates nodes a grid based environment in accordance with certain embodiments. NodeA 500, NodeB 530, and NodeC 550 are coupled to each other via a communication network 590. NodeA 500, NodeB 530, and NodeC 550 may each implement the architecture of cloud computing node 10.

NodeA 500, NodeB 530, and NodeC 550 each include the replication engine 510, which implements grid based replication. Any one of the nodes 500, 530, 550 may be a source node that executes operations that the replication engine 510 replicates to the other, target nodes 500, 530, 550.

NodeA 500, NodeB 530, and NodeC 550 each include a statement engine 512, 532, 552 for executing statements (e.g., DDL operations). In certain embodiments, the statement engine 512, 532, 552 is a Structured Query Language (SQL) engine.

NodeA 500, NodeB 530, and NodeC 550 each include data 514, 534, 554 and metadata 516, 536, 556. The replication engine 510 is used to replicate the data 514, 534, 554 and the metadata 516, 536, 556.

NodeA 500, NodeB 530, and NodeC 550 each include grid control structures 518, 538, 558. In certain embodiments, the grid control structures are internally defined replicated tables (described with reference to FIG. 6). Operations that are issued by a user may be referred to as "statements", while operations stored in the grid control structures may be referred to as "commands".

NodeA 500, NodeB 530, and NodeC 550 each include a session control structure 520, 540, 560 for storing session data. In certain embodiments, each session control structure 520, 540, 560 is a Session Control Block (SCB).

NodeA 500, NodeB 530, and NodeC 550 each include a connection engine 522, 542, 562. The connection engine 522, 542, 562 is used to notify the replication engine 510 that DDL operations should be replicated from that source node to the other, target nodes.

The grid based environment may be described as a loosely coupled group of servers, which can be used to address a client's application needs. The grid based environment is distinct from a cluster in that each of the nodes do not have to be running with similar hardware or software, and the nodes can be widely distributed. Also, the nodes within a grid based environment can have locally distinct data.

Embodiments combine the concepts of a computer grid, replication technology, and a statement engine 512, 532, 552 (which executes DDL operations) to create a solution in which the execution of basic DDL operations is able to create the replication rules and coordinate the propagation of the DDL operations to all nodes within that grid.

With embodiments, the DDL operation propagation is not restricted to the creation of a table. All DDL operations which are not associated with a temporary table may be propagated, including the DDL operations for creation of a database.

As the DDL is replicated, any changes to the replication metadata is performed so that that replication of the DML changes are performed, including those DML operations which might have taken place within the transaction that created the table.

Thus, with embodiments, nodes at alternate locations have the same associated objects as other nodes containing the replicated table. On the other hand, conventional change data capture/apply solutions, the typical process is to create tables and then define replication rules on top of those tables. Typically, conventional change data capture/apply solutions consider the changes of data within the table (e.g., rows and columns), and do not consider the changes of metadata associated with the replicated tables (e.g., triggers, constraints, indexes, stored procedures, etc.).

Moreover, with traditional registration of a table for replication, if a table is created and that table is subsequently defined to be a replicated table, there is a window which exists because data can be inserted into that table prior to the registration of the table for replication. Since some of the data was created prior to registration, the source and any targets are inconsistent until some form of synchronization is performed. For an isolated table, this is not a significant problem, but consider the multi-master environment in which other constraints, such as referential integrity, might exist. It is possible in such a case that the tables on a target node will become active prior to all of the replication rules being in place, and, thus, resulting in apply failures on other nodes within the grid based environment. However, with embodiments, this is avoided.

In certain embodiments, the grid is defined (e.g., by using a cdr utility) and involves defining the name of the grid and a list of servers which will be included as a member of that grid. Security is enforced to limit the nodes and users within a grid which can function as the source of grid object creation (i.e., DDL propagation sources).

In certain embodiments, it is possible to propagate the DDL operations without propagating the DML changes. This may be useful with customers who have to manage a large number of remote systems and need to propagate schema changes to those systems.

When the replication engine 510 is activated on a node, the replication engine 510 creates the grid control structures 518, 538, 558 at that node. In certain embodiments the grid control structures 518, 538, 558 are internally defined replicated tables that are part of the metadata 516, 536, 556. The grid control structures 518, 538, 558 have well defined replicate identities so that each of the nodes 500, 530, 550 in the grid is able to identify them. Each of these grid control structures 518, 538, 558 has a unique identifier.

Figure 6:
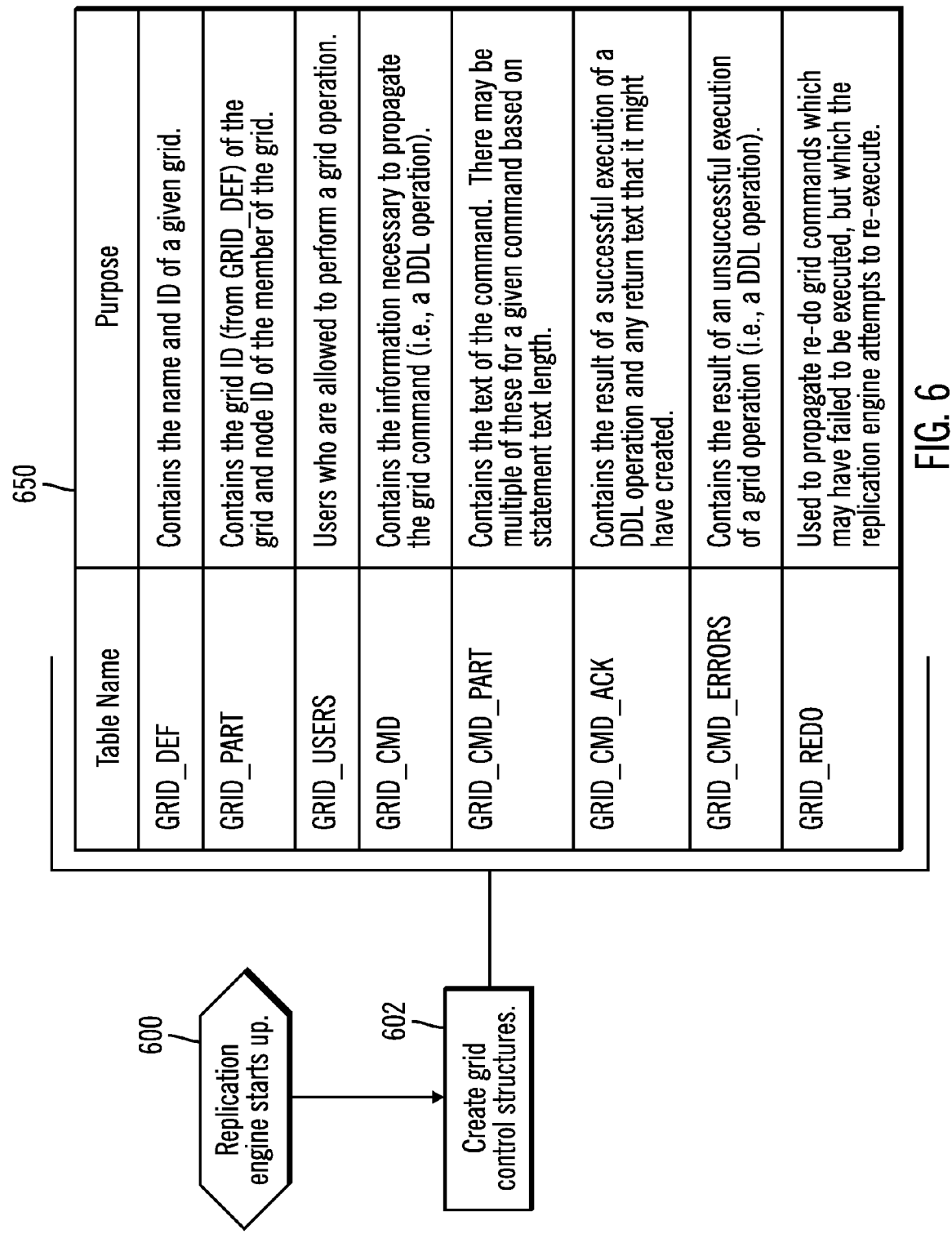
FIG. 6 illustrates logic, in a flow diagram, for creating grid control structures in accordance with certain embodiments.

FIG. 6 illustrates logic, in a flow diagram, for creating grid control structures 518, 538, 558 in accordance with certain embodiments. Control begins at block 600 with the replication engine 510 starting up. In block 602, the replication engine 510 creates the grid control structures 518, 538, 558. Grid control structures 650 are an example of the grid control structures 518, 538, 558. The grid control structures 518, 538, 558 comprise objects used to support grid based replication. The GRID_DEF (grid definition) and GRID_PART (grid part) structures define the grid and the domain of the grid. The GRID_CMD (grid command), GRID_CMD_PART (grid command part), and GRID_CMD_ERRORS (grid command errors) structures are used to propagate the DDL operations to be executed. The GRID_REDO (grid redo) structure is used to re-execute a DDL operation which previously failed to execute.

This listing of claims will replace all prior versions, and listings, of claims in the application:

The creation of the grid involves insertions into the GRID_DEF, GRID_USERS (grid users), and GRID_PART structures. Since these structures are internally replicated, these updates are be propagated to all nodes within the grid.

In certain embodiments, not all DDL operations are propagated. In such embodiments, some objects are created at a grid level and some objects are created at a local level. To support the creation of an object as a grid object, the user connects to the desired grid. In certain embodiments, connecting to the grid may be done by executing the connection engine 522, 542, 562. In certain embodiments, the connection engine 522, 542, 562 is a built-in procedure. In certain embodiments, the procedure for connecting to the grid has the following form:

ifx_grid_connect(<grid_name>, [<optional RS registration>])

The procedure for connecting to the grid validates that the user is allowed to create grid objects from the current server. If the user is permitted to perform grid level operations, then any subsequent DDL operation will be propagated to the other nodes within the grid. A second optional parameter may be set to 1 to allow for automatic registration (auto-registration) of any CREATE/ALTER/DROP table DDL operation with the replication engine 510.

Figure 7:
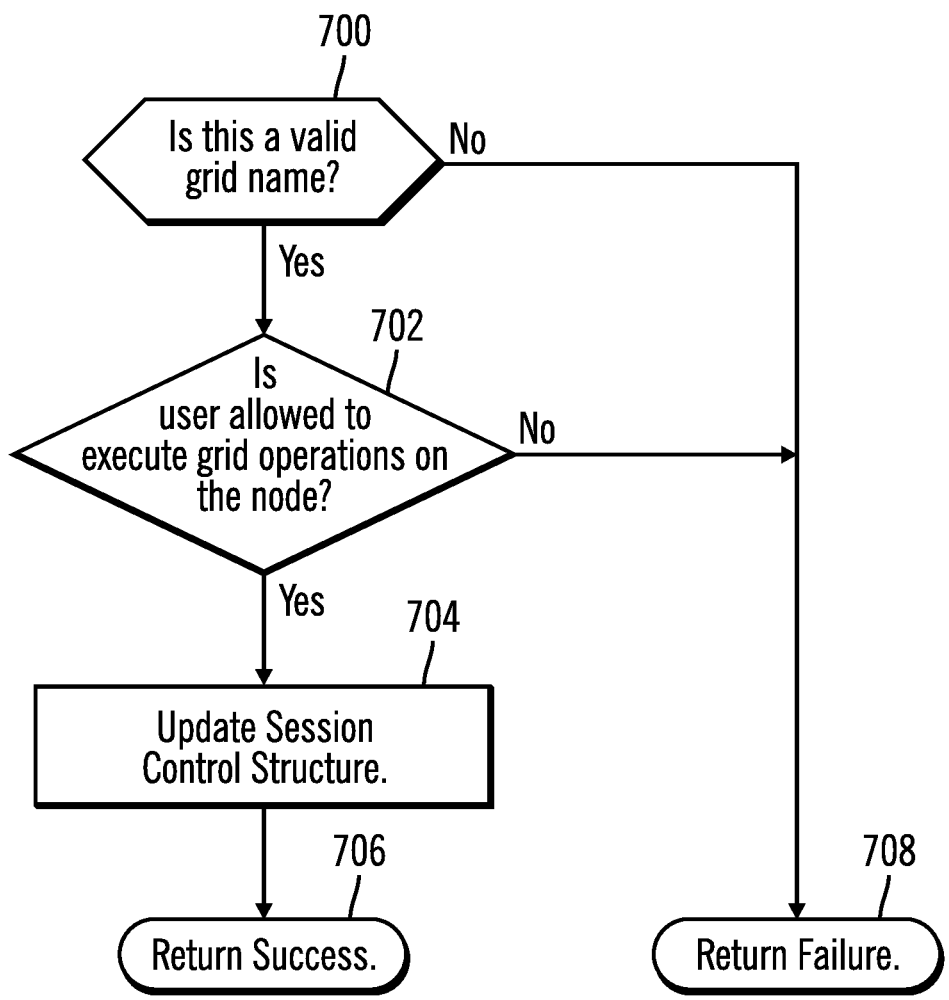
FIG. 7 illustrates logic, in a flow diagram, for connecting to a grid in accordance with certain embodiments.

FIG. 7 illustrates logic, in a flow diagram, for connecting to a grid in accordance with certain embodiments. In certain embodiments, the connection engine 522, 542, 562 executes the procedure for connecting to the grid. Once a user has issued the procedure for connecting to the grid, control begins at block 700 with the connection engine 522, 542, 562 determining whether the grid name identified in the procedure for connecting to the grid is a valid grid. If the grid name is valid, processing continues to block 702, otherwise, processing continues to block 708. In block 702, the connection engine 522, 542, 562 determines whether the user making the request to connect to the grid is allowed to execute grid operations on the node. This may be determined using the GRID_USERS structure. If the user or node is allowed, processing continues to block 704, otherwise, processing continues to block 708. In block 704, the connection engine 522, 542, 562 updates the session control structure 520, 540, 560 to indicate that DDL operations are to be propagated to other nodes and to indicate the grid that identifies where the grid operations are to be propagated. In block 706, the connection engine 522, 542, 562 returns an indication of success, and the user is connected to the grid. In block 708, the replication engine 706 returns an indication of failure, and the user is not connected to the grid.

Thus, the processing of FIG. 7 executes the ifx_grid_connect( ) procedure. Also, embodiments provide a grid operation to disconnect from the grid, which takes the form: ifx_grid_disconnect( ). The procedure to disconnect from the grid clears the grid information from the session control structure 520, 540, 560.

If the user has successfully executed the ifx_grid_connect( ) procedure, then the replication engine 510 captures each DDL operation being executed and places each DDL operation into the GRID_CMD structure. This is done as part of the same transaction that performs the DDL operation. When the replication engine 510 inserts into the GRID_CMD structure, the replication engine 510 uniquely identifies each DDL operation, obtains the locale that the user is using, obtains the user identifier (userid), obtains the text of the operation being performed, and obtains an indication as to whether the user requested replication engine 510 auto-registration or not. Locale may be described as language or code set that is being used at a node, such as Unicode or English American Standard Code for Information Interchange (ASCII)).

If the DDL operation is a DROP table or an ALTER table, then the replication engine 510 makes additional callbacks to drop any replicates on the table or to re-define the replicate definition as is needed. The replication engine 510 does not create the replicate here, as the transaction has not committed, and, thus, the table does not exist to other nodes yet.

Figure 8:
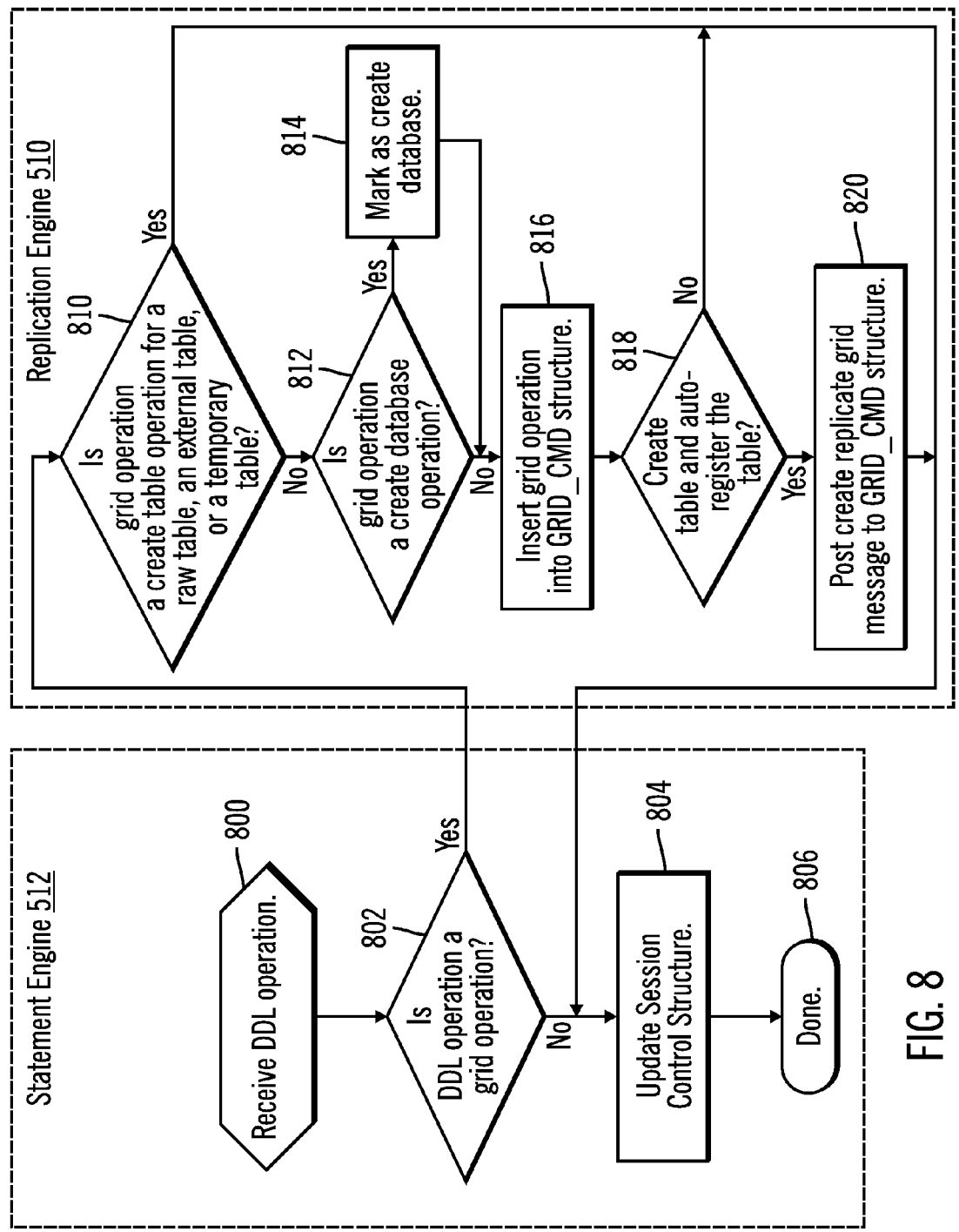
FIG. 8 illustrates logic, in a flow diagram, for posting of grid operations in accordance with certain embodiments.

FIG. 8 illustrates logic, in a flow diagram, for posting of grid operations in accordance with certain embodiments. In FIG. 8, blocks 800-806 are performed by the statement engine 512, 532, 552 and blocks 810-820 are performed by the replication engine 510.

Control begins at block 800 with the statement engine 512, 532, 552 receiving a DDL operation. In block 802, the statement engine 512, 532, 552 determines whether the DDL operation is a grid operation. If so, processing continues to block 810, otherwise, processing continues to block 804. In block 804, the statement engine 512, 532, 552 updates the session control structure 520, 540, 560. In block 806, processing is done.

Thus, during the execution of a DDL operation, the replication engine 510 checks to see whether the DDL operation is to be treated as a grid operation or not. If this is a DDL operation that can be propagated as a grid operation, and the user had successfully executed the ifx_grid_connect( ) procedure, then a call is made from the statement engine 512, 532, 552 to the replication engine 510 to determine whether to post the DDL operation to the GRID_CMD structure or not. Posting to the GRID_CMD structure comprises writing a message (e.g., the DDL operation or a callback) to the GRID_CMD structure.

In block 810, the replication engine 510 determines whether the grid operation is a create table operation for a raw table, an external table, or a temporary table. If so, processing continues to block 804 (i.e., processing returns to the statement engine 512, 532, 552), otherwise, processing continues to block 812. In block 812, the replication engine 510 determines whether the grid operation is a create database operation. If so, processing continues to block 814, otherwise, processing continues to block 816. In block 814, the replication engine 510 marks that this grid operation is a create database operation. In certain embodiments, this is done to ensure that the apply operation at a particular node executes the create database operation in a unique, autonomous transaction.

In block 816, the replication engine 510 inserts the grid operation into the GRID_CMD structure. The DDL operation is propagated from the authorized, source node to one or more other, target nodes in the grid at the end of the transaction that posted the operation into the GRID_CMD structure. In block 818, the replication engine 510 determines whether to create a table and auto-register the table. If so, processing continues to block 820, otherwise, processing continues to block 804. In block 820, the replication engine 510 posts a create replicate grid message (i.e., an additional record) in the GRID_CMD structure. From block 820, processing continues to block 804. As part of the posting to the GRID_CMD structure, the replication engine 510 includes the userid, current database, locale, and statement text. The replication engine 510 makes sure that the DDL operation is applied on each target node using the same userid and locale as on the source node. If this is a table creation, the replication engine 510 does not automatically create the replicate definition at this point because the create table transaction has not yet committed. Instead, the replication engine 510 posts the create replicate grid message to the GRID_CMD structure, which will function as a define replication operation. This will contain the replicate name to be created, the database, the owner, and the table. In certain embodiments, the replication engine 510 also activates full row logging for the table. This ensures that any subsequent insert/update operation has enough logging information to successfully replicate the row, including any inserts or updates within the current transaction.

The common practice for replication capture is to snoop the log records for data changes that the replication engine 510 wants to capture and propagate to the target nodes. Normally for DDL operations, the replication engine 510 does not have to perform any special logic during the capture, since the DDL operations within grid replication are placed into an internally defined replicated table. However, this is not the case if the user had requested that any table be auto-registered for replication. The replication engine 510 can not actually create the replicate metadata for the table until the transaction that creates the table has committed. Yet, the transaction which created the table could also have performed inserts into that table as part of the transaction. So, the replication engine 510 may not be able to snoop for the logs of inserts into the new table until the replication metadata has been updated.

Figure 9:
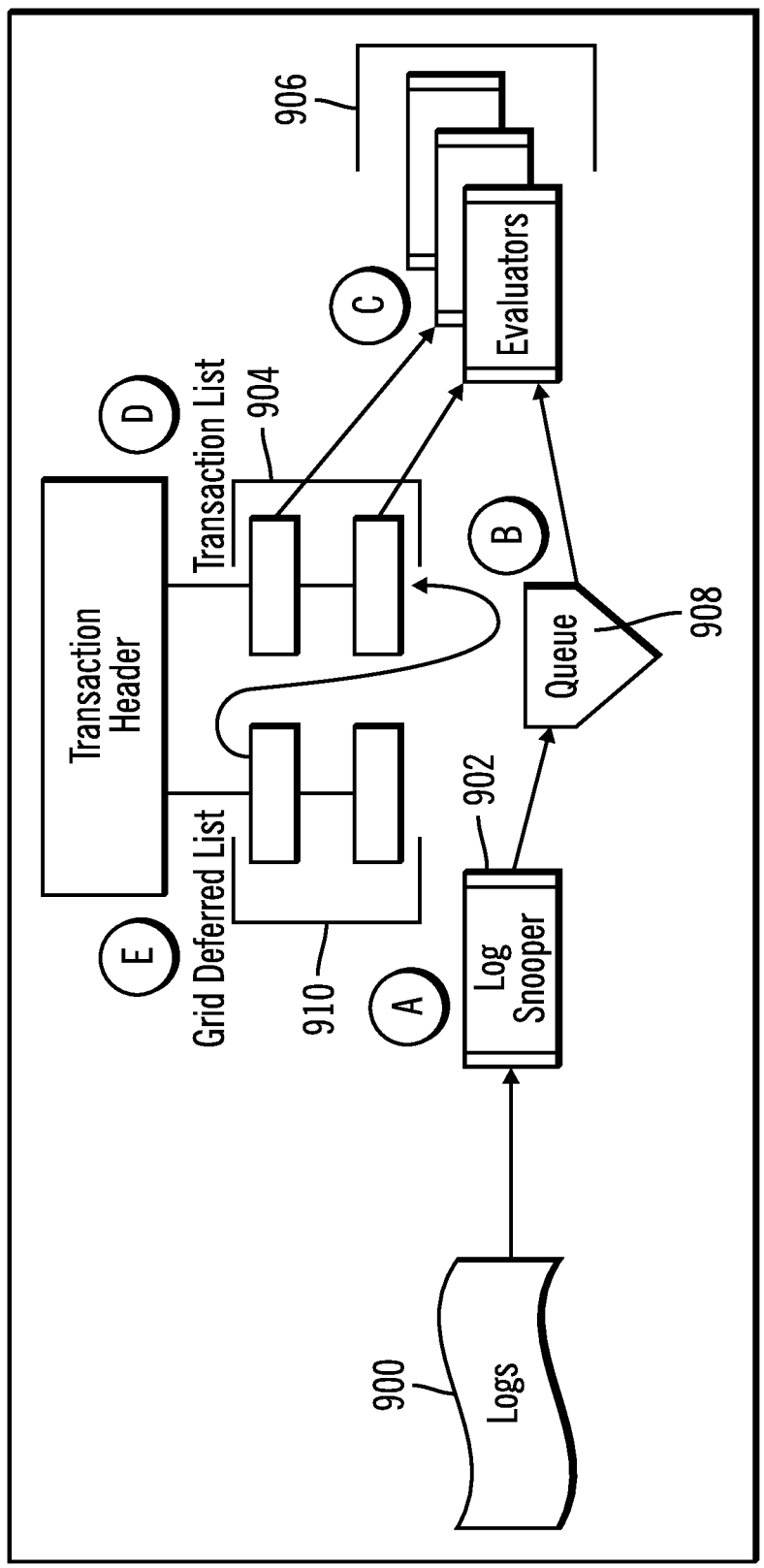
FIG. 9 illustrates log snooping in accordance with certain embodiments.

FIG. 9 illustrates log snooping in accordance with certain embodiment. As the replication engine 510 snoops the logs 900 and rebuilds a row image for a row using log snooper 902 (A), the replication engine 510 attaches that row to a transaction list 904 (D) and passes the row to a group of evaluator threads 906 (C) to determine whether the replication engine 510 is interested in the row or not. This is done by placing the row to a queue 908 (B) which interfaces between the log snooper 902 and the evaluator threads 906.

If the log snooper 902 detects a row belonging to the GRID_CMD structure, the log snooper 902 checks to see whether the row is for a replication auto-register operation. If so, then the log snooper 902 flags the transaction as in a grid-defer state. That log record and all subsequent log records for that transaction are placed on the grid deferred list 910 (E) and are not immediately queued to the evaluator threads 906.

If the log snooper 902 finds that the transaction ended with a rollback, then the transaction is aborted and the items in the grid deferred list 910 are freed. If the transaction ends with a commit, then the items in the grid deferred list are placed on the transaction list 904 and queued to the evaluator threads 906.

While removing the log records from the grid deferred list 910, a check is made to see if the log record is a GRID_CMD row and the row represents an auto-register operation for a replicated table. If that is the case, then the replication engine 510 defines the replicated table with the replication engine 510 metadata and makes all of the nodes within the grid as members of the replicate definition. Since the replication engine 510 deferred all subsequent log records for the transaction, and since the update to the replication metadata is performed by the log snooping thread, the replication engine 510 knows that by updating the replication metadata while moving the log records from the grid deferred list 910, that the evaluator threads 906 will recognize the new replicated table and will correctly send the rows to each target table at each target node.

In certain embodiments, when the replication engine 510 defines a replicated table, the replication engine 510 propagates the metadata to the other, target nodes immediately. In certain embodiments, this is loosened a bit with replicates created as part of grid based auto-register. The table is not yet created on the target nodes, so the replication engine 510 can not successfully create the replicate metadata on the target nodes. Yet, the replication engine 510 must include the target nodes in the replicate definitions on the source so that the network threads know where to send the replicated data to.

For DDL operations (other than to register a basic define table), auto-registration takes a slightly different path than for DDL operations to register a basic define table. Even with the create table, there are occasions where the replication engine 510 has to define the replicate as part of the transaction, such as when the table is created and altered within the same transaction.

In grid context, when auto-registration is enabled for DDL operations, the statement engine 512, 532, 552 makes callbacks into the replication engine 510 before executing a DDL operation, after executing a DDL operation, after committing a transaction, or after rolling back a transaction. These callbacks are done to update replication metadata for the database object (e.g., a table, stored procedure, index, user authorization, etc.) in question. Auto-registration includes defining new replicate definitions, deleting existing replicate definitions before dropping database objects, changing replicate definitions after alter, or renaming SQL objects.

FIG. 10 illustrates logic, in a flow diagram, for auto-registration in accordance with certain embodiments. FIG. 10 is formed by FIGS. 10A, 10B, 10C and 10D. In FIG. 10, blocks 1000-1010 (FIG. 10A) are performed by the statement engine 512, 532, 552, and blocks 1020-1060 (FIGS. 10B, 10C, and 10D). In FIG. the statement engine 512, 532, 552 makes callbacks into the replication engine 510 during DDL operation processing.

Figure 10A:
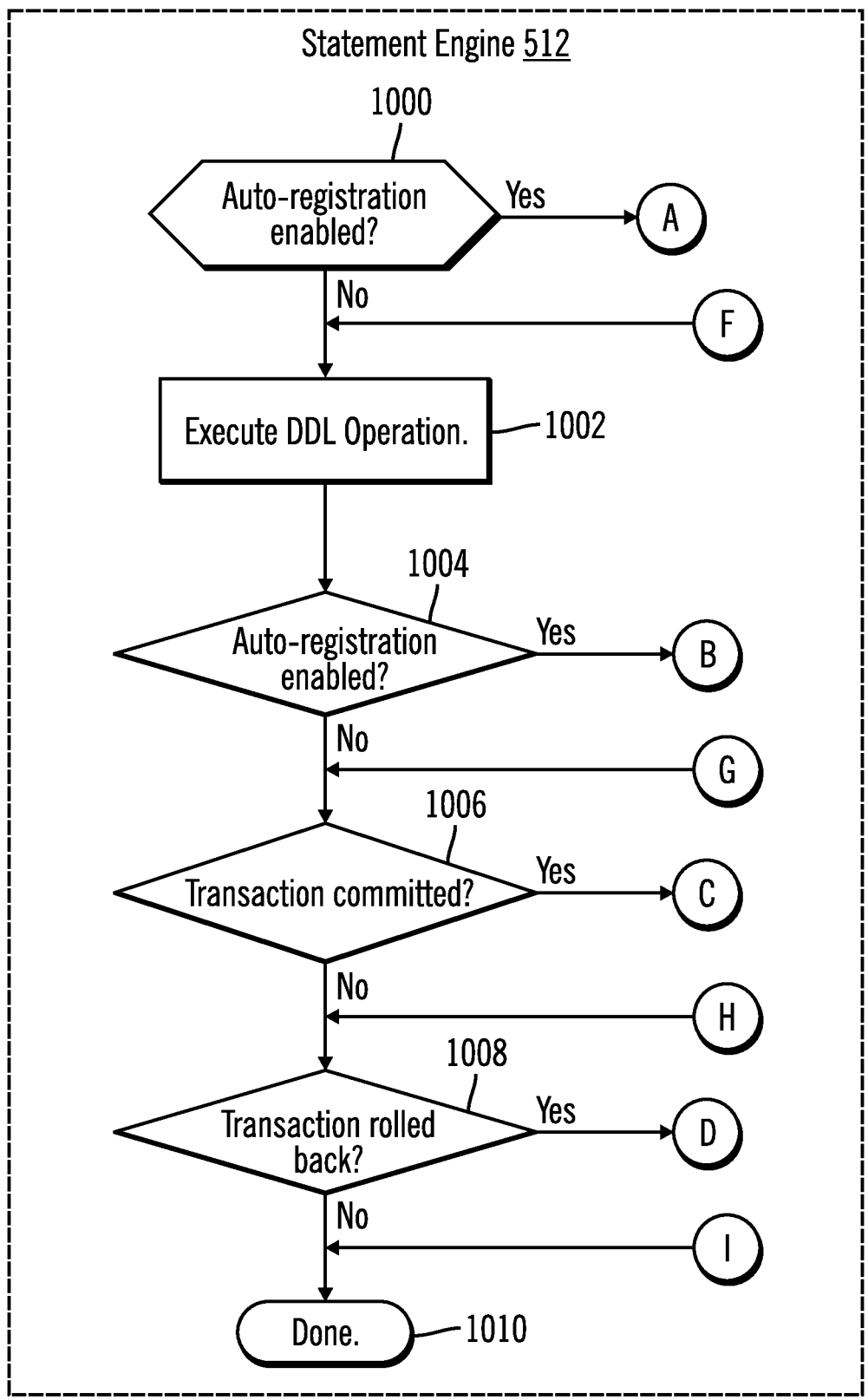
FIG. 10 illustrates logic, in a flow diagram, for auto-registration in accordance with certain embodiments.

In FIG. 10A, control begins at block 1000 with the statement engine 512, 532, 552 determining whether auto-registration is enabled. If so, processing continues to block 1020 (FIG. 10B), otherwise, processing continues to block 1002. In block 1002, the statement engine 512, 532, 552 executes the DDL operation. In block 1004, the statement engine 512, 532, 552 determines whether auto-registration is enabled. If so, processing continues to block 1030 (FIG. 10C), otherwise, processing continues to block 1006. In block 1006, the statement engine 512, 532, 552 determines whether the transaction committed. If so, processing continues to block 1050 (FIG. 10D), otherwise, processing continues to block 1008. In block 1008, the statement engine 512, 532, 552 determines whether the transaction rolled back. If so, processing continues to block 1060 (FIG. 10D), otherwise processing continues to block 1010. In block 1010, processing is done.

Figure 10B:
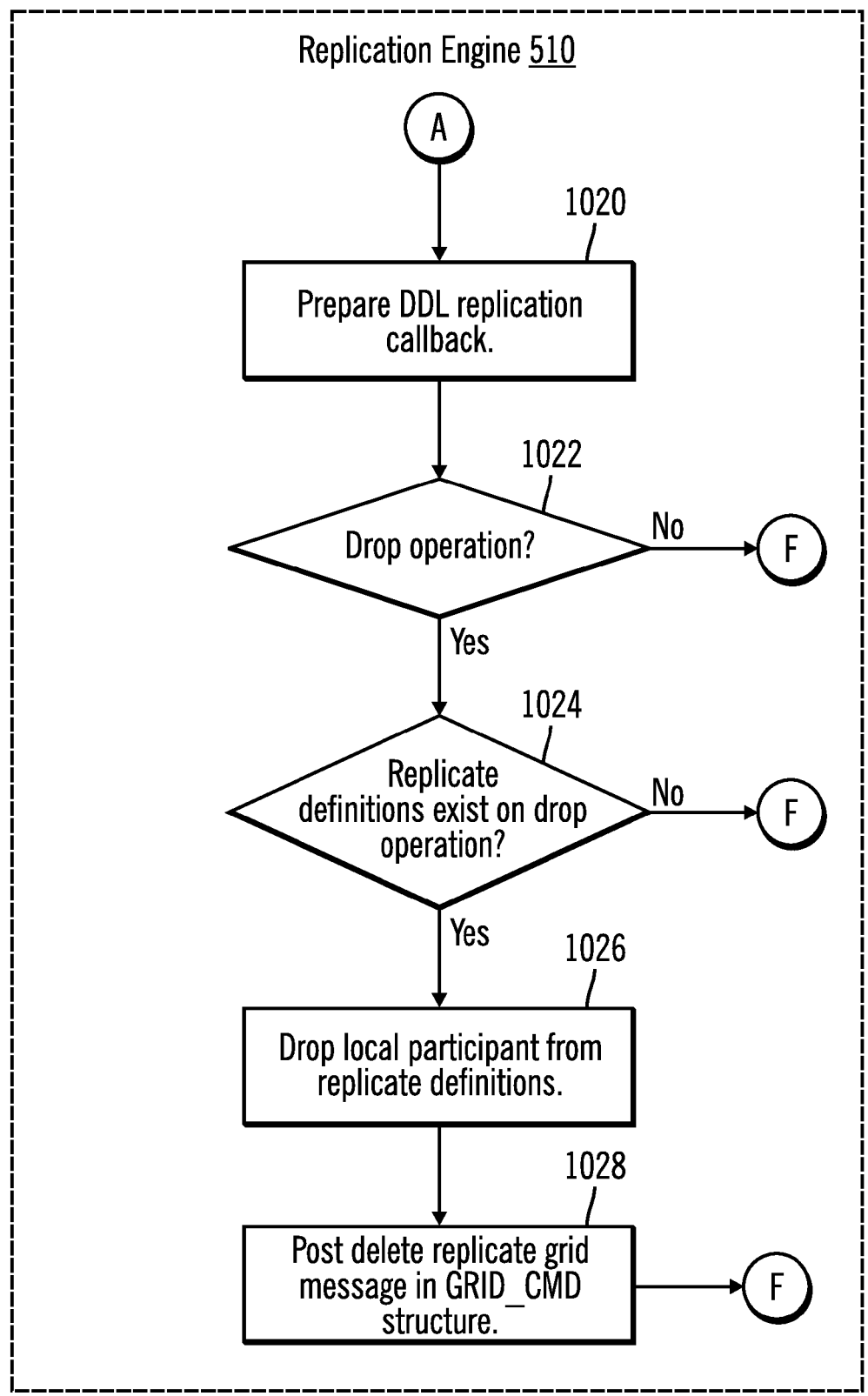

In block 1020 of FIG. 10B, the replication engine 510 prepares a DDL replication callback. In block 1022, the replication engine 510 determines whether this is a drop operation (e.g., a drop table operation). If so, processing continues to block 1002 (FIG. 10A), otherwise, processing continues to block 1024. In block 1024, the replication engine 510 determines whether replicate definitions exist on the drop operation. If so, processing continues to block 1026, otherwise, processing returns to block 1002 (FIG. 10A). In block 1026, the replication engine 510 drops the local participant (i.e., source node) from the replicate definition. This will end replication of the object to be dropped (e.g., a table) on the source node, and changes made at the source node on that object are not replicated to other nodes. In block 1028, the replication engine 510 posts a delete replicate grid message to the GRID_CMD structure. From block 1028, processing continues to block 1002.

Figure 10C:
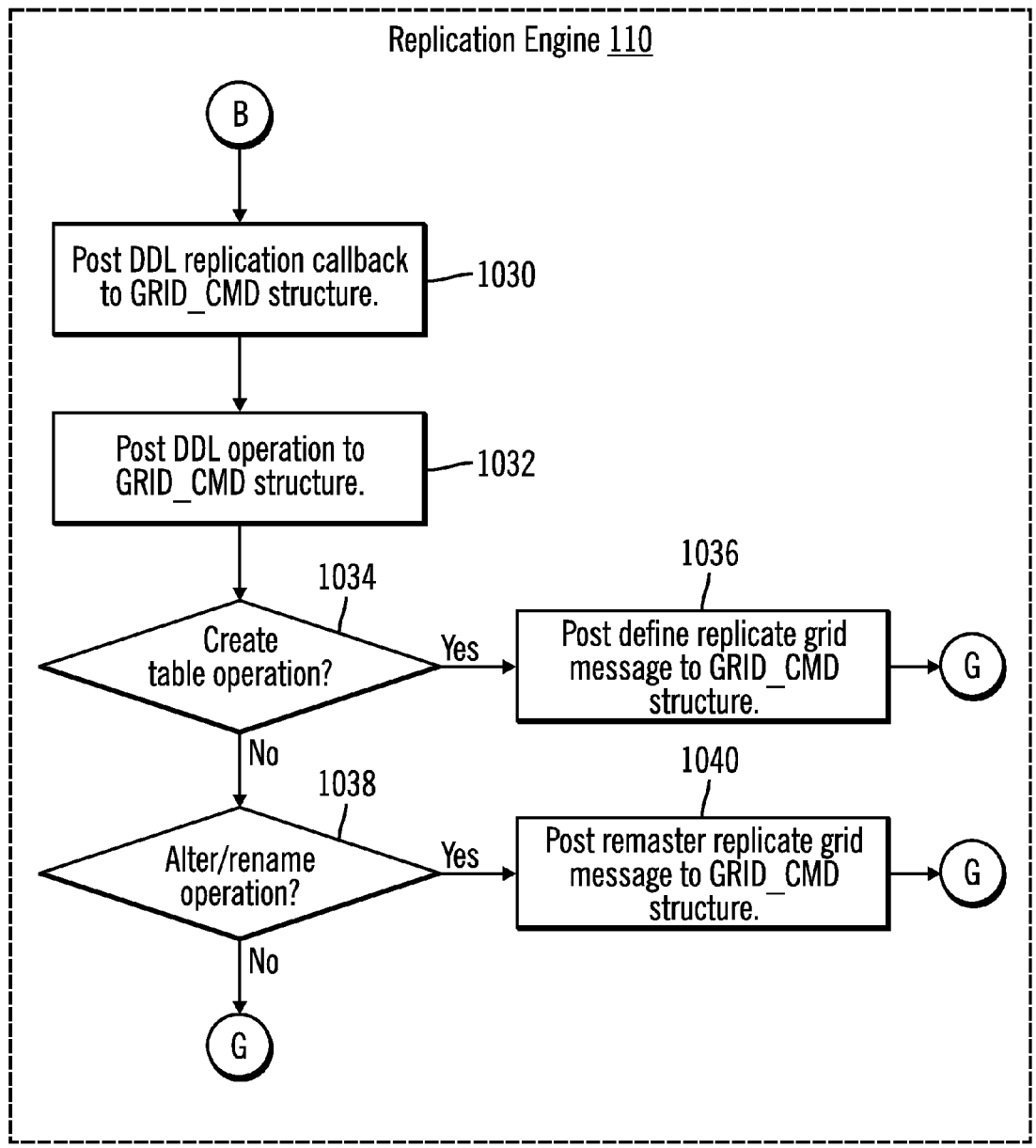

In block 1030 of FIG. 10C, the replication engine 510 posts a DDL replication callback (created in block 1020 of FIG. 10B) to the GRID_CMD structure. In block 1032, the replication engine 510 posts a DDL operation to the GRID_CMD structure. In block 1034, the replication engine 510 determines whether the DDL operation is a create table operation. If so, processing continues to block 1036, otherwise, processing continues to block 1038. In block 1036, the replication engine 510 posts a define replicate grid message to the GRID_CMD structure. This starts the creation of replication metadata for the table. From block 1036, processing continues to block 1006 (FIG. 10A). In block 1038, the replication engine 510 determines whether the DDL operation is an alter or rename operation. If so, processing continues to block 1040, otherwise, processing continues to block 1006 (FIG. 10A). In block 1040, the replication engine 510 posts a remaster replicate grid message to the GRID_CMD structure. From block 1040, processing continues to block 1006 (FIG. 10A).

Figure 10D:
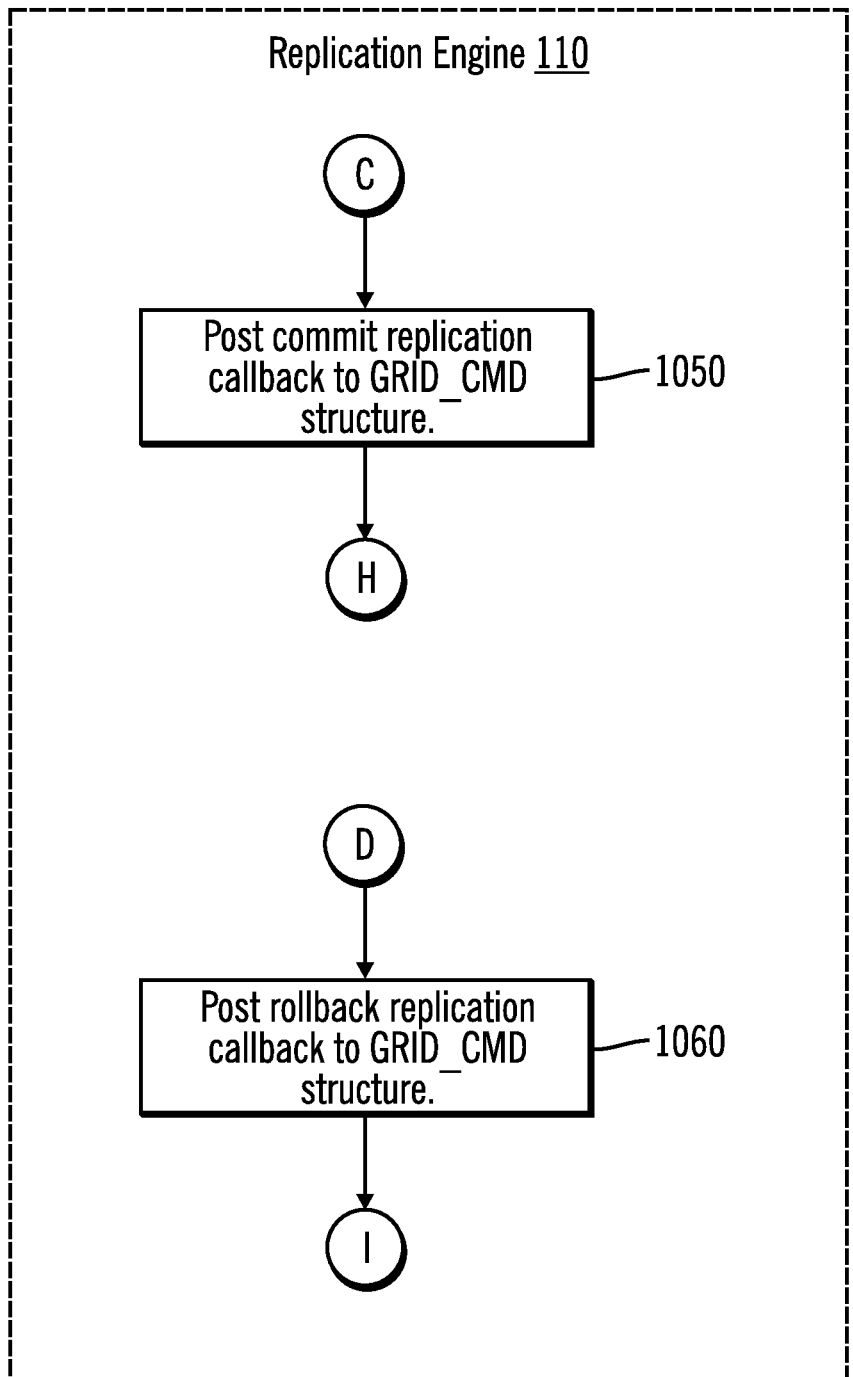

In block 1050 of FIG. 10D, the replication engine 510 posts a commit replication callback to the GRID_CMD structure. From block 1050, processing continues to block 1008 (FIG. 10A).

In block 1060 of FIG. 10D, the replication engine 510 posts a rollback replication callback to the GRID_CMD structure. From block 1056, processing continues to block 1010 (FIG. 10A).

As the replication engine 510 receives a replicated transaction, the replication engine 510 checks to see if any of the rows within the transaction are for the GRID_CMD structure. If they are, then the replication engine 510 performs a two-part pass of the transaction during the apply. The first part is to apply any rows for the grid operations (i.e., from the GRID_CMD and GRID_CMD_PART structures). This is followed by the apply of all other rows within the transaction. The reason for this two-part apply is that to create any tables and create the local replication metadata for the transaction before processing user data changes within the transaction. There could be replicated rows within that transaction for tables created within that same transaction. The replication engine 510 makes sure that the tables are created on the target node before trying to process the replicated data.

The original DDL operation text may require multiple entries (e.g., rows) within the GRID_CMD_PART structure. Thus, there is a 1-to-N relationship between the GRID_CMD structure and the GRID_CMD_PART structure.

Figure 11:
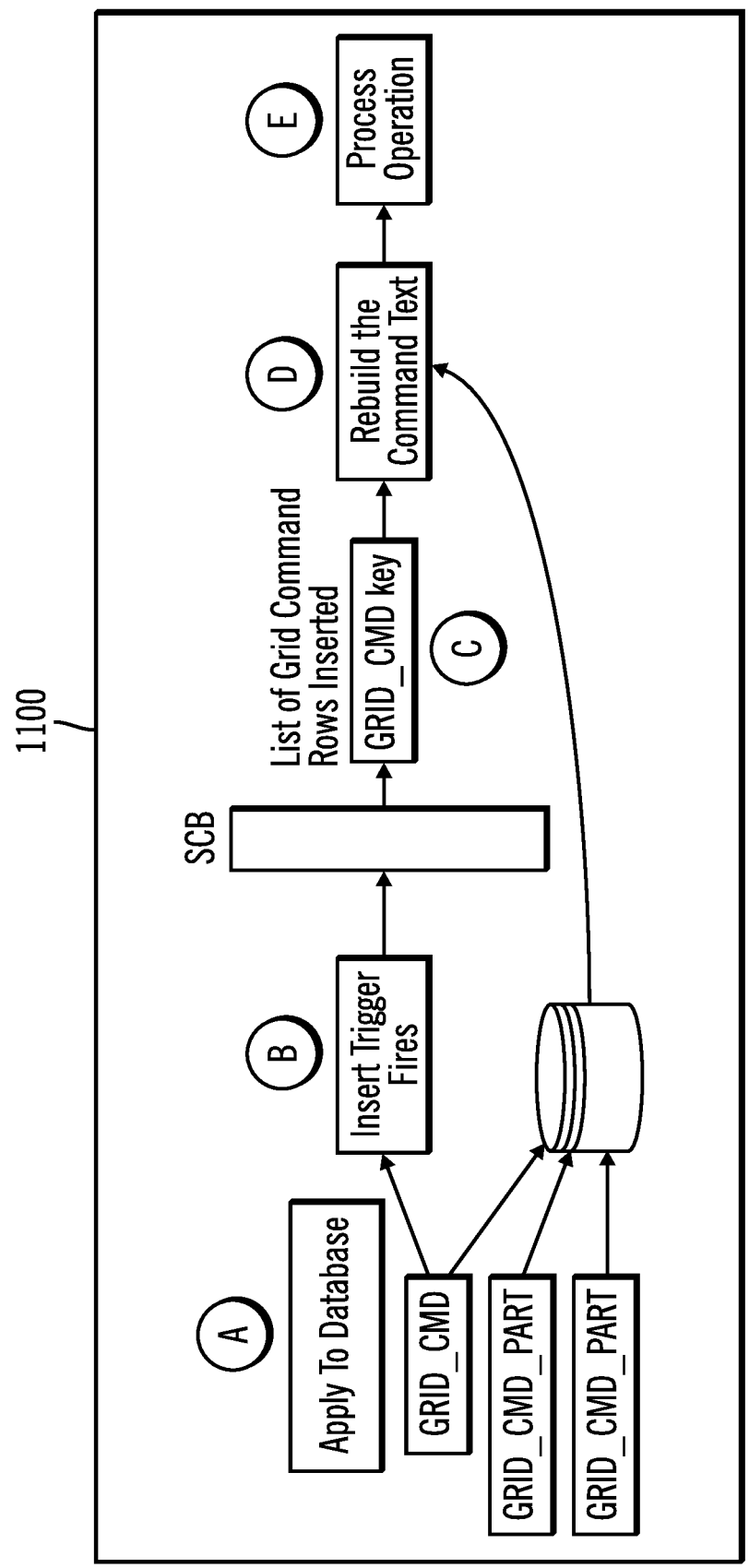
FIG. 11 illustrates a process for applying DDL operations in accordance with certain embodiments.

FIG. 11 illustrates a process 1100 for applying DDL operations in accordance with certain embodiments. As the replication engine 510 applies the GRID_CMD rows (A), the replication engine 510 fires a trigger (B), which invokes a built-in stored procedure. This built-in stored procedure passes the primary key of the GRID_CMD row to a procedure where the GRID_CMD key is attached to the session control structure (C). When the replication engine 510 finishes the first pass, the replication engine 510 examines the contents of this list (D) and determines the keys of the rows of the GRID_CMD structure that were just applied and by indirection, the rows of the GRID_CMD_PART structure as well. By doing that, the replication engine 510 rebuilds the text of the replicated DDL operations, along with the user, locale, and database in which the original DDL operation was executed. Once the replication engine 510 has rebuilt the DDL operation, the replication engine 510 can process the operation (E).

The processing of the grid operation can vary depending on the operation being executed. If the operation is a DDL operation other than a create database operation, the operation can be executed inside the open apply transaction. If the operation is a create database or replication auto-register operation, then a separate thread process is spawned to perform the execution. The reason for this is that a create database operation can not be done from within an open transaction, and the replication metadata changes is best done outside of the apply thread.

Figure 12A:
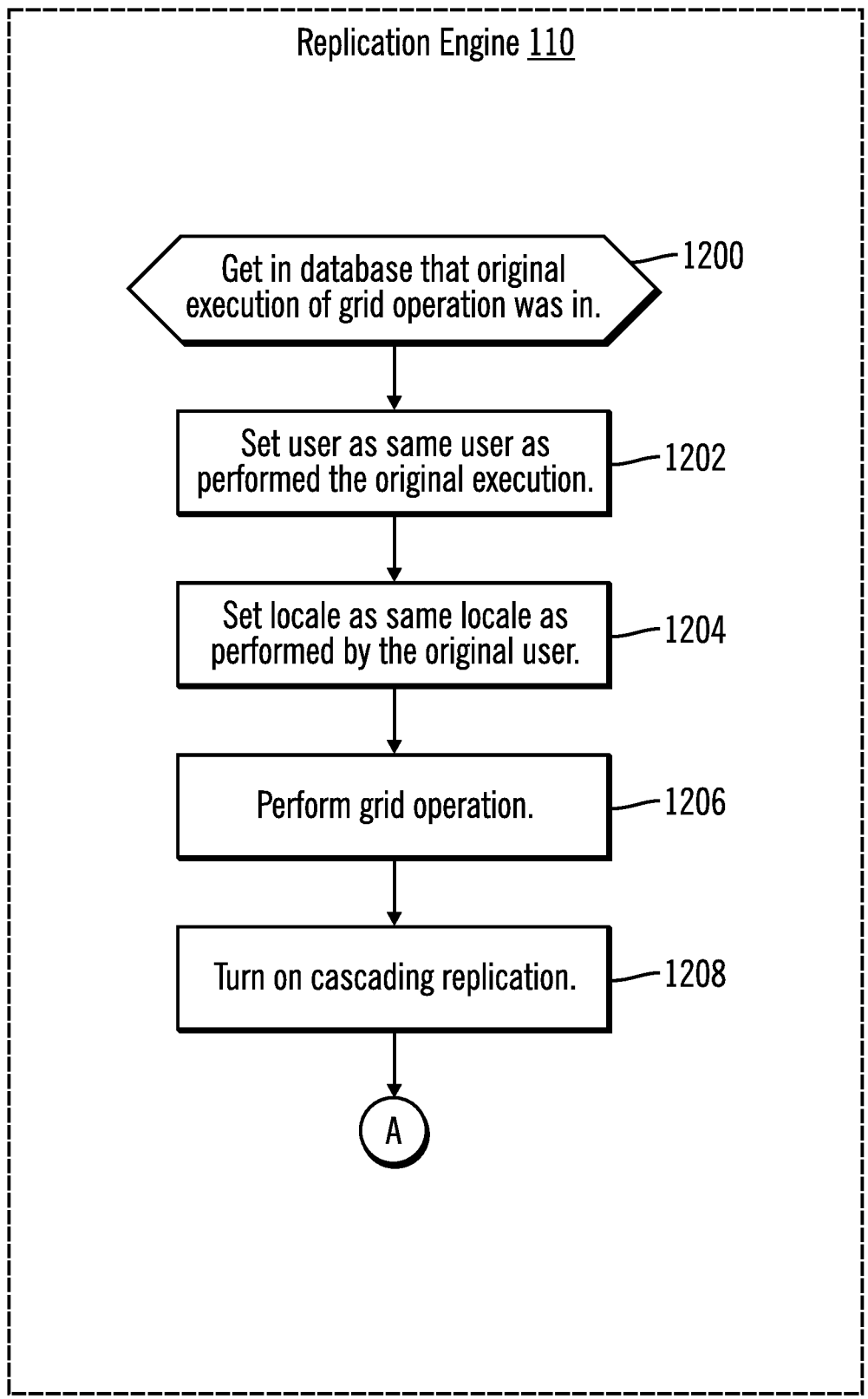
FIG. 12 illustrates logic, in a flow diagram, for processing a grid operation in accordance with certain embodiments.
Figure 12B:
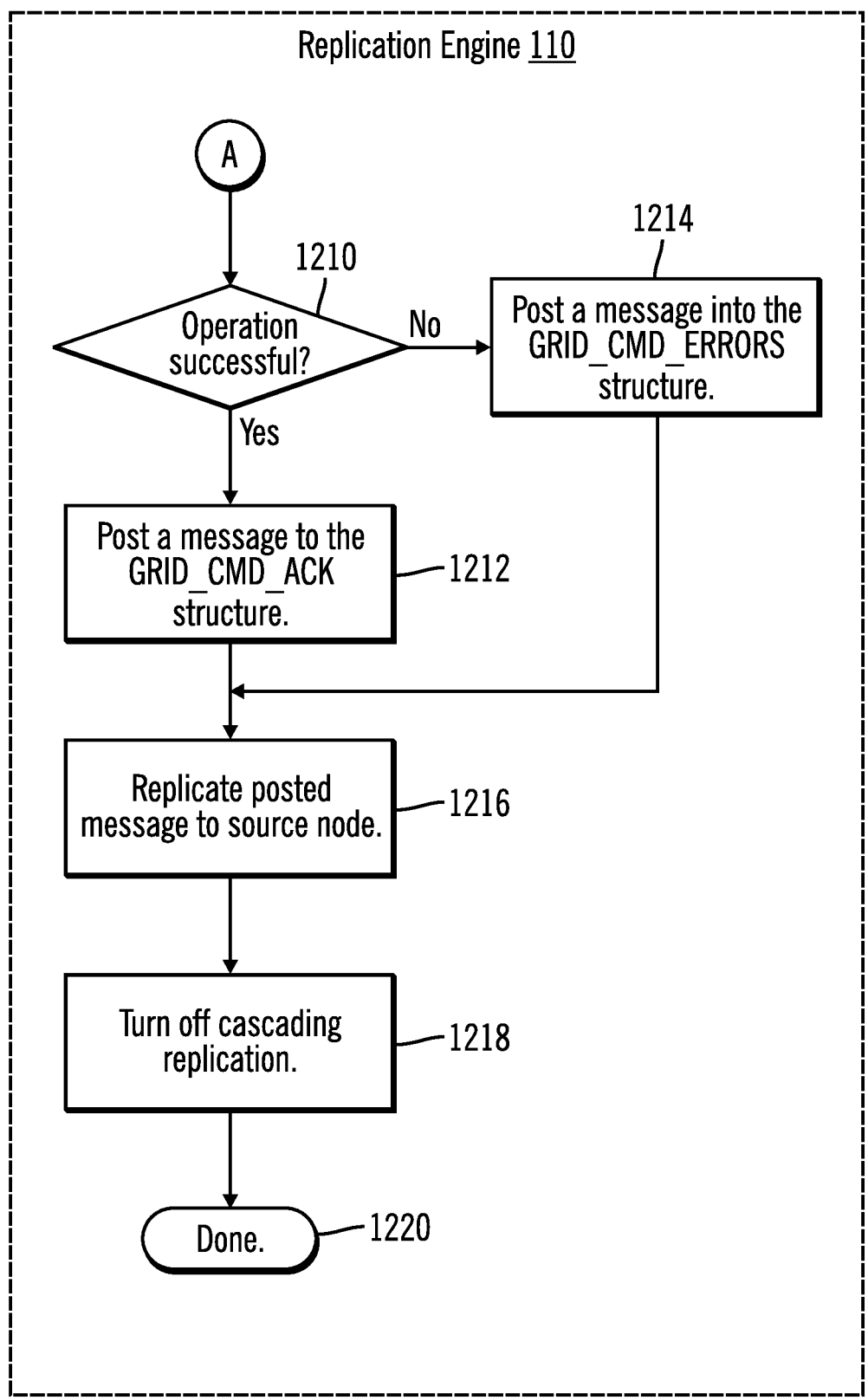

FIG. 12 illustrates logic, in a flow diagram, for processing a grid operation in accordance with certain embodiments. FIG. 12 is formed by FIG. A and FIG. B. Control begins at block 1200 with the replication engine 110 get in the database that the original execution of the grid operation was in. In block 1202, the replication engine 110 sets the user as the same user who performed the original execution. In block 1204, the replication engine 110 sets the locale as the same locale as performed by the original user. In block 1206, the replication engine 110 performs the grid operation. In block 1208, the replication engine turns on cascading replication. Cascading replication may be described as a period in which the log records of the target apply are re-snooped and replicated from the target. In block 1210, the replication engine determines whether the grid operation was successful. If so, processing continues to block 1212, otherwise, processing continues to block 1214. In block 1212, if the grid operation is successful, the replication engine 110 posts a message to the GRID_CMD_ACK (grid command acknowledgement) structure. In block 1214, if the grid operation was not successful, then the replication engine 110 posts a message into the GRID_CMD_ERRORS structure. Since both the GRID_CMD_ACK and GRID_CMD_ERRORS structures are internally defined replicated tables, the ACK/FAILURE status will be replicated back to the source node. Thus, in block 1216, the replication engine 110 replicates the posted message to the source node. In block 1218, the replication engine 110 turns off the cascading replication. In block 1220, processing is done for the grid operation.

If the operation was a create replicate operation, then the replication engine 510 creates the replicate metadata as a local-only change. The original metadata changes would have already been sent as a control message, but would have failed on this node because the table did not yet exist. By adding the local-only changes, the replication engine 510 is correcting that failure, since the table has been created.

After the grid operations have been applied, the replication engine 510 enters the second phase of the apply and can apply the other log records within the transaction.

With embodiments, when the statement engine 512, 532, 552 performs a DDL operation, the statement engine 512, 532, 552 makes calls into the replication engine 510 to ensure that the DDL operation can be properly processed and that the data from a DML operation can be properly replicated. For instance, if the replication engine 510 creates a table is created with no primary key, the replication engine 510 automatically generates a hidden column to act as a replication key. Also if the replication engine 510 adds a new column to an existing table, the replication engine 510 automatically modifies the replicate definition. The reason for this is that we can perform the DDL operation to modify a table and perform DML operations on that modified table within the DDL operation.

Moreover, with embodiments, the replication engine 510 tracks the success or failure of the apply of any grid operation, such as a DDL operation. If there is an apply failure, then the replication engine 510 is able to redo those grid operations after the cause of the failure has been corrected. For example, the cause of the apply failure might be something like running out of disk space.

Figure 13:
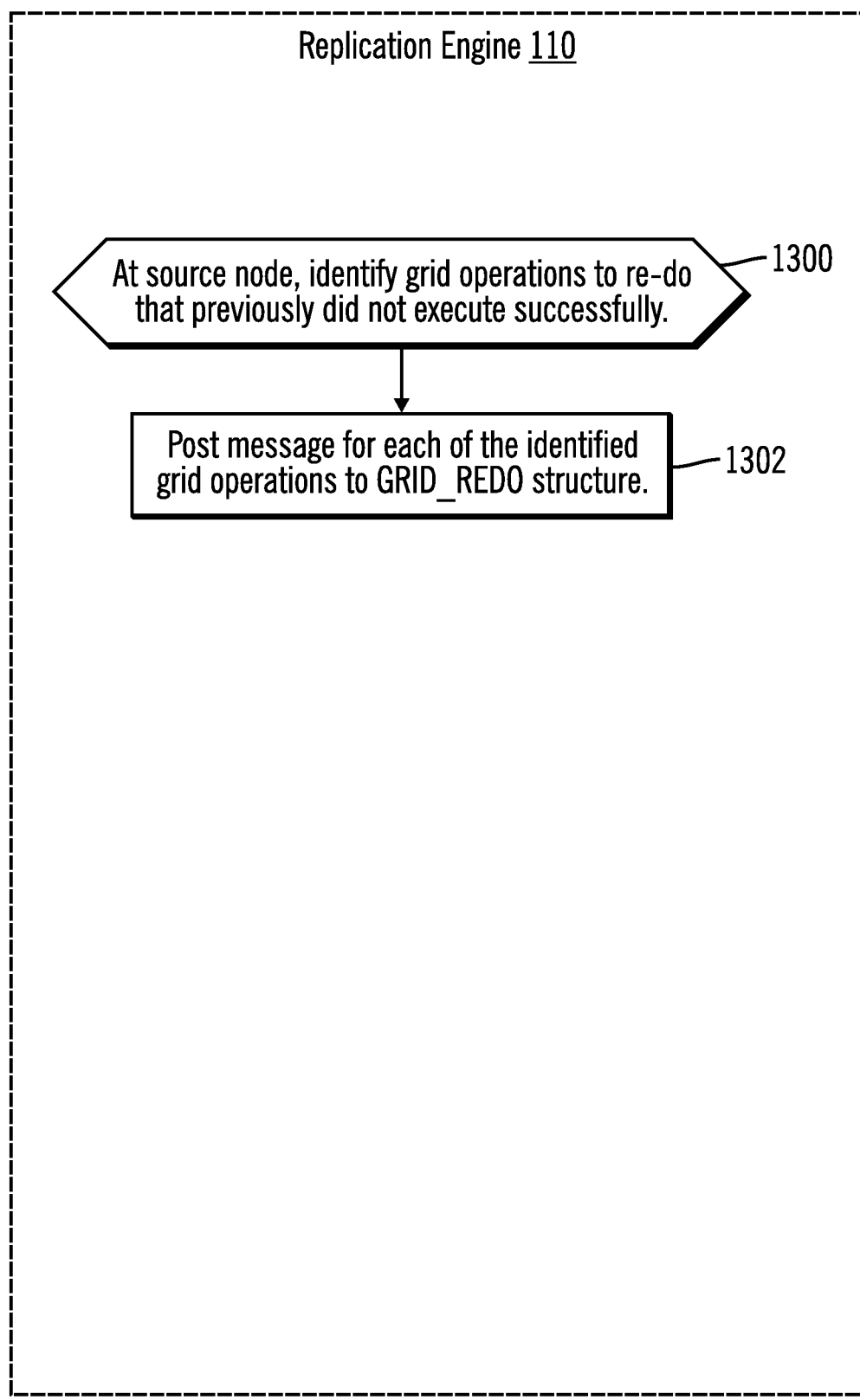
FIG. 13 illustrates logic, in a flow diagram for re-doing grid operations in accordance with certain embodiments.

FIG. 13 illustrates logic, in a flow diagram for re-doing grid operations at a source node in accordance with certain embodiments. Control begins at block 1300 with the replication engine 110, at the source node that initially executed the grid operations, identifying the grid operations to re-do that previously did not execute successfully. In block 1302, the replication engine 110 posts a message for each of the identified grid operations to the GRID_REDO structure.

Figure 14:
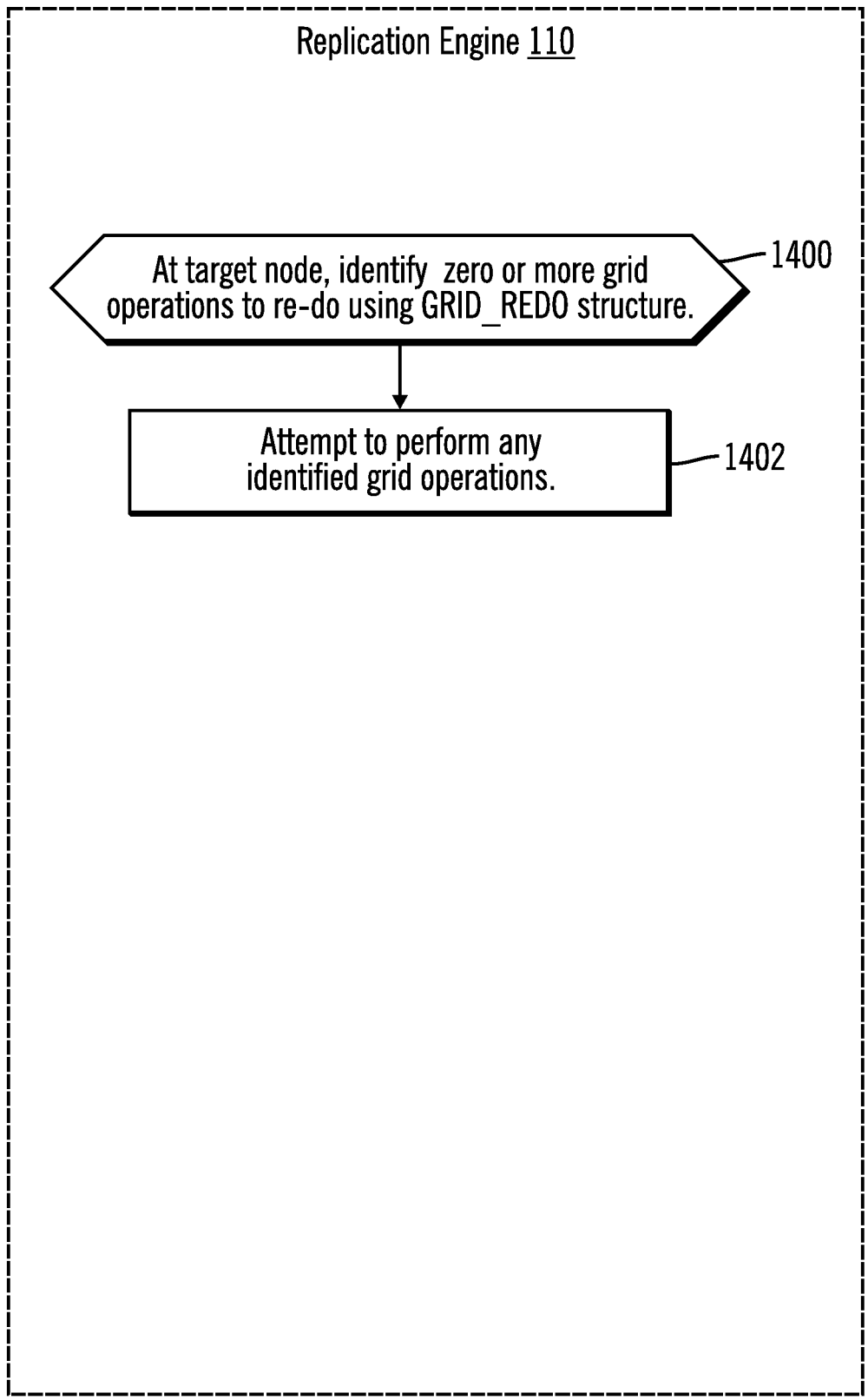
FIG. 14 illustrates logic, in a flow diagram for re-doing grid operations at a target node in accordance with certain embodiments.

FIG. 14 illustrates logic, in a flow diagram for re-doing grid operations at a target node in accordance with certain embodiments. Control begins at block 1400 with the replication engine 110, at each target node, identifying zero or more grid operations for that target node to re-do based on the messages in the GRID_REDO structure. In block 1402, the replication engine attempts to perform any identified grid operations (in accordance with the logic described with reference to FIG. 12).

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The replication engine 510 may be implemented as hardware (e.g., hardware logic or circuitry), software, or a combination of hardware and software.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for replication in a grid based environment, comprising:
   creating, using a processor of a computer, a grid command structure; and
   at an authorized node in a grid of nodes,
      inserting a Data Definition Language (DDL) operation into the grid command structure;
      in response to determining that the DDL operation is for creating a table and that auto-registration is enabled for the table, posting a create replicate grid message in the grid command structure with a replicate name to be created, a database, an owner, and the table;
      activating full row logging for the table; and
      propagating the DDL operation from the authorized node to one or more other nodes in the grid of nodes at the end of a transaction that inserted the DDL operation into the grid command structure.

2. The method of claim 1, further comprising:
   storing a DDL operation in the grid command structure with a userid, a current database, a locale, and operation text, wherein the DDL operation is to be applied at each of the nodes using a same userid and a same locale as on the authorized node.

3. The method of claim 1, further comprising:
   identifying a log record with data changes to be propagated to target nodes from the authorized node, wherein the log record belongs to the grid command structure;
   determining whether the log record is for a replication auto-register operation; and
   in response to determining that the log record is for a replication auto-register operation, flagging a transaction associated with the log record as in a grid-defer state, wherein the log record and subsequent log records for the transaction are placed on a grid deferred list.

4. The method of claim 1, further comprising:
   in response to determining that auto-registration is enabled,
      preparing a DDL replication callback to the grid command structure; and
      in response to determining that the DDL operation is a drop operation and that replicate definitions exist on the drop operation,
         dropping a local participant from replicate definitions; and
         posting a delete replicate grid message in the grid command structure.

5. The method of claim 1, further comprising:
   in response to executing the DDL operation and determining that auto-registration is enabled,
      posting a DDL replication callback to the grid command structure;
      posting the DDL operation to the grid command structure;
      in response to determining that the DDL operation is a create statement object, posting a define replicate message to the grid command structure; and
      in response to determining that the DDL operation is an alter or rename statement object, posting a remaster replicate grid message to the grid command structure.

6. The method of claim 1, further comprising:
   in response to determining that a transaction has committed, posting a commit replication callback to the grid command structure; and
   in response to determining that a transaction rolled back, posting a rollback replication callback to the grid command structure.

7. The method of claim 1, further comprising:
   in response to receiving a replicated transaction at a target node,
      identifying rows within the transaction that are for the grid command structure; and
      performing a two-part pass of the transaction by first applying rows for the grid operations and second applying other rows for the transaction.

8. The method of claim 1, further comprising:
   identifying one or more grid operations that previously did not execute successfully; and
   attempting to perform the identified one or more grid operations.

9. The method of claim 1, wherein software is provided as a service in a cloud environment.

\* \* \* \* \*